(12) United States Patent
Bindl et al.

(10) Patent No.: US 10,609,271 B2
(45) Date of Patent: Mar. 31, 2020

(54) SYSTEM FOR VISUALIZING IMAGE DATA

(71) Applicant: Fraunhofer-Gesellschaft zur Foerderung der angewandten Forschung e.V., Munich (DE)

(72) Inventors: Thomas Bindl, Erlangen (DE); Michaela Benz, Erlangen (DE); Christian Muenzenmayer, Hagenbuechach (DE)

(73) Assignee: Fraunhofer-Gesellschaft zur Foerderung der angewandten Forschung e.V., Munich (DE)

(*) Notice: Subject to any disclaimer, the term of this patent is extended or adjusted under 35 U.S.C. 154(b) by 447 days.

(21) Appl. No.: 15/348,671

(22) Filed: Nov. 10, 2016

(65) Prior Publication Data

US 2017/0142321 A1 May 18, 2017

(30) Foreign Application Priority Data

Nov. 13, 2015 (DE) .................... 10 2015 222 489

(51) Int. Cl.
*H04N 5/232* (2006.01)
*G02B 21/36* (2006.01)
(Continued)

(52) U.S. Cl.
CPC ....... *H04N 5/23206* (2013.01); *G02B 21/365* (2013.01); *G02B 21/367* (2013.01);
(Continued)

(58) Field of Classification Search
CPC ...... H04N 19/33; H04N 19/597; H04N 19/61; H04N 19/176; H04N 19/30;
(Continued)

(56) References Cited

U.S. PATENT DOCUMENTS 9,230,298 B2 * 1/2016 Kunigita .................... G06T 3/40
9,710,598 B2 * 7/2017 Yamane ................ G06F 19/321
(Continued)

FOREIGN PATENT DOCUMENTS

DE   69925084 T2   6/2006
EP   0994433 A1   4/2000
(Continued)

OTHER PUBLICATIONS

Beynon, et al., "The Virtual Microscope", IEEE Transactions on Information Technology in Biomedicine, IEEE Service Center, Los Alamitos, CA, US, Bd. 7, Nr. 4, 1.XP011106562, ISSN: 1089-7771, Dec. 2003, pp. 230-248.
(Continued)

*Primary Examiner* — Dave Czekaj
*Assistant Examiner* — Kehinde Abimbola
(74) *Attorney, Agent, or Firm* — Perkins Coie LLP; Michael A. Glenn

(57) ABSTRACT

What is provided is a system for visualizing digitalized image data having an image data source and an image data sink. The image data are associated to at least two different layers, wherein, for at least one of the layers as the reference layer, image data is present in at least two different resolutions. The layers show a common scene at different conditions of taking a picture. The image data source is configured to transfer to the image data sink image data of the reference layer in the at least two different resolutions in a prioritized manner relative to the image data of layers different from the reference layer. The image data source is configured to transfer to the image data sink, in a reload case where the image data source has transferred the image data of the reference layer to the image data sink at a presettable reference resolution, the image data of a presettable number
(Continued)

of layers different from the reference layer in at least one presettable reload resolution.

13 Claims, 5 Drawing Sheets

(51) Int. Cl.
    *G06F 17/30*     (2006.01)
    *H04N 5/225*     (2006.01)
    *G06F 16/51*     (2019.01)
    *G02B 27/22*     (2018.01)
    *H04N 13/111*     (2018.01)

(52) U.S. Cl.
CPC ......... *G02B 27/2278* (2013.01); *G06F 16/51* (2019.01); *H04N 5/2259* (2013.01); *H04N 5/23216* (2013.01); *H04N 5/23232* (2013.01); *H04N 5/23238* (2013.01); *H04N 5/23293* (2013.01); *H04N 13/111* (2018.05)

(58) Field of Classification Search
CPC ........... H04N 5/23216; H04N 5/23229; H04N 19/182; H04N 19/46; H04N 5/23245; H04N 19/86; H04N 7/15; H04N 13/161; H04N 19/117; H04N 19/70; H04N 19/187; H04N 19/593; H04N 19/44; H04N 19/105; H04N 19/59
See application file for complete search history.

(56) References Cited

U.S. PATENT DOCUMENTS

| | | |
|---|---|---|
| 2004/0167806 A1 | 8/2004 | Eichhorn et al. |
| 2012/0162228 A1* | 6/2012 | Yamane ................ G06F 19/321 345/428 |
| 2015/0015578 A1 | 1/2015 | Eichhorn et al. |
| 2016/0111039 A1* | 4/2016 | Iwami .............. H04N 21/43637 345/520 |

FOREIGN PATENT DOCUMENTS

| | | |
|---|---|---|
| EP | 2687891 A1 | 1/2014 |
| WO | 03073365 A1 | 9/2003 |

OTHER PUBLICATIONS

Chang, et al., "T2: A Customizable Parallel Database for Multi-dimensional Data", Sigmod Record, ACM, New York, Ny, US, Bd. 27, Nr. 1, 1.X0058219458, Issn: 0163-5808, Mar. 1998, 58-66.

Trotts, et al., "Interactive visualization of multiresolution image stacks in 3D", Neuroimage, Elsevier, Amsterdam, NL, Bd. 35, Nr. 3, 4. , XP022335908, ISSN: 1053-8119, Apr. 2007, pp. 1038-1043.

* cited by examiner

SYSTEM FOR VISUALIZING IMAGE DATA

CROSS-REFERENCE TO RELATED APPLICATION

This application claims priority from German Application No. 10 2015 222 489.9, which was filed on Nov. 13, 2015, and is incorporated herein by reference in its entirety.

BACKGROUND OF THE INVENTION

The present invention relates to a system for visualizing digitalized image data comprising at least one image data source and one image data sink. Additionally, the invention relates to a device for transmitting digitalized image data comprising at least one image data source. Furthermore, the invention relates to a corresponding method for visualizing digitalized image data. Advantageously, the invention relates to a web-based real-time visualization of digitalized image data.

The digitalized image data to be visualized may, for example, come from a microscope coupled to a camera and a corresponding processing unit, for example a computer. In order to take a picture the sample as completely as possible, the sample is mostly moved laterally and also vertically (i.e. in the z direction) relative to the objective of the microscope. Visualization is described, for example, in US 2015/0015578 A1, US 2004/0167806 A1 and DE 699 25 084 T2.

Image data from pictures coming from different lateral regions will subsequently be referred to as field of view. The number of fields of view here depends mainly on the characteristics of the objective of the microscope, the size of the region to be considered and the pixel quantity of the camera. When taking pictures at a lateral position in different z positions, i.e. in different height positions, the term image stack will be used for the entirety of the associated image data. Finally, the entirety of all the fields of view and image stacks will be referred to as a digital slide. As discussed below, this is supplemented by different resolutions.

The term real-time visualization generally describes a display of the image data, continuous or smooth for the observer, without any reloading processes which functionally run in the background being recognizable.

In the application example of digital microscopy, real-time visualization refers to both the zoom process into the image data and also the change of the image displayed from one image stack to another one. This is to resemble "focusing", like in the microscope.

When there is, for example, a slide having 900 fields of view (including image stacks with 11 levels each), the memory space necessitated will be roughly 30 GB. Such data quantities, however, cannot be visualized in real-time using the Web, so that methods for dealing with such data quantities are known already.

Real-time visualization is dependent on the quantity of the region to be displayed so that displaying the image data in a full-screen mode on a small monitor may be more continuous or smooth than on a large monitor. A further influencing factor is the speed of the internet connection for transmitting the image data via the Web.

In the real-time visualization of large 2D image data in the web browser, there are different requirement categories. When the image is to be displayed without a zoom function, usually subdividing the image into smaller image tiles will be sufficient for a continuous display of an image section. Here, only the respective image tiles necessitated are transmitted.

In the case of a zoom function, the entire image is additionally stored in lower resolutions. However, the data quantity increases by storing the image in several resolution levels.

Special converting methods for reducing the data quantity try to avoid redundant information. The image data in the lower resolution levels, for example, are not stored, but calculated. This may be applied in an advantageous manner when the image contents differ from one another only slightly. Image stacks of very different contents, in contrast, cannot be stored in a considerably more efficient manner.

A large disadvantage of a receiver-side or server-side conversion of large image data is the latency time resulting on the one hand and the necessitated computing power on the other hand.

Dealing with large image data quantities applies not only to the field of digital microscopy, but results, for example, also when dealing with satellite data or hyper-spectrograms. The image data here are usually transmitted from an image data source to an image data sink which form a permanent or, maybe, only temporary system for visualizing image data.

Consequently, the object underlying the invention is suggesting a system for visualizing and a corresponding method which avoid the disadvantages of the known technology and which, above all, allow image stacks to be visualized in the most resource-saving manner and the most continuous manner. In particular, the object refers to 3-dimensional image data having been described before which are associated to several layers in at least partly differing resolutions.

SUMMARY

An embodiment may have a system for visualizing digitalized image data having at least one image data source and one image data sink, herein the image data are associated to at least two different layers, wherein, for at least one of the at least two different layers as the reference layer, image data are present in at least two different resolutions, wherein the at least two different layers show a common scene at different conditions of taking a picture, wherein the image data source is configured to transfer image data to the image data sink, wherein the image data sink is configured to receive image data from the image data source and process same relative to visualization, wherein the image data source is configured to transfer to the image data sink image data of the reference layer in the at least two different resolutions in a prioritized manner relative to image data from layers different from the reference layer, and wherein the image data source is configured to transfer to the image data sink, in a reload case where the image data source has transferred the image data of the reference layer to the image data sink at a presettable reference resolution, the image data of a presettable number of layers different from the reference layer in at least one presettable reload resolution.

Another embodiment may have a device for transmitting digitalized image data, having at least one image data source configured to output image data associated to at least two different layers so that, for at least one of the at least two different layers as the reference layer, the image data are present in at least two different resolutions, wherein the at least two different layers show a common scene at different conditions of taking a picture, wherein the image data source is configured to transmit the image data of the reference layer in the at least two different resolutions in a prioritized manner relative to the image data of layers different from the reference layer, and wherein the image data source is configured to output, in case the image data source has output the image data of the reference layer at a presettable reference resolution, the image data of a presettable number of layers different from the reference layer.

Still another embodiment may have a method for visualizing digitalized image data, wherein the image data are associated to several layers, wherein the layers show a common scene at different conditions of taking a picture, wherein the image data for a reference layer are present in different resolutions, wherein the image data of the reference layer in the different resolutions are transferred and processed relative to visualization in a prioritized manner relative to the image data of layers different from the referencee layer, and wherein, in case the image data of the reference layer have been output at a presettable reference resolution, the image data of a presettable number of layers different from the reference layer are output.

As regards the system, the invention achieves the object by the fact that the image data are associated to at least two different layers, that, for at least one of the at least two different layers as the reference layer, the image data are present in at least two different resolutions, and that the at least two different layers show a common scene at different conditions of taking a picture. The image data source is configured to transfer image data to the image data sink. In addition, the image data sink is configured to receive image data from the image data source and process the same relative to visualization. Furthermore, the image data source is configured to transfer to the image data sink image data of the reference layer in the at least two different resolutions in a prioritized manner relative to the image data of layers different from the reference layer. Additionally, the image data source is configured to transfer to the image data sink, in a reload case where the image data source has transferred the image data of the reference layer to the image data sink at a presettable reference resolution, the image data of a presettable number of layers different from the reference layer in at least one presettable reload resolution.

The image data relate to several, in particular at least two, layers which show the same scene, for example an object to be measured or an arrangement of several objects or items which, however, have been taken at different conditions of taking a picture. In the application case of microscopy, the image data are 2-dimensional layers in the x-y plane which differ among one another as regards the distance—or object distance or item width—between the object to be measured and the objective. Thus, the layers are associated to different heights along the z axis. In an alternative or supplementary implementation, the condition of taking a picture is setting the depth of focus. In an additional—alternative or supplementary—embodiment, the condition of taking a picture refers to the respective spectral region used so that the system is applied in the field of visualization hyper-spectrograms.

In addition, for at least the reference layer, the image data are present at different resolutions, i.e. for at least one layer, the same scene is shown at least once with a better, and once with a poorer resolution.

Thus, the resolution is not among the conditions of taking a picture relevant for differentiating the layers among one another.

The image data source transmits or transfers the image data of the reference layer present in at least two resolutions in a prioritized manner. In one additional embodiment, the image data of the reference layer here are transmitted in several resolutions and, in an additional embodiment, in all the resolutions present for the reference layer, however at least in the at least two resolutions present.

The image data of the other layers are transmitted to this one layer in a subordinate manner. This feature of prioritized or subordinate processing may be that the image data of the other layers are loaded only after transmitting the image data of the one layer in the different resolutions, and are thus reloaded. In addition, the image data from the other layers may be transmitted in only one resolution or not the image data from all the other layers may be transmitted.

In one embodiment, the conditions of taking a picture define a depth of focus setting, object width or spectral sensitivity. The conditions of taking a picture thus generally relate to the manner in which the image data are gained.

In one embodiment, the image data for the at least two different layers are each present in at least two different resolutions. In an embodiment based thereon, the image data relate to a plurality of layers which are each present in several resolutions. In principle, this results in a greater data quantity on the side of the image data source.

In an embodiment starting from this, the image data source is configured to transfer to the image data sink the image data of one of the at least two different layers—or in a different, above embodiment of the several layers present—as a so-called reference layer in the at least two different resolutions.

The one layer to be processed in a prioritized manner here is referred to as the reference layer. This layer may be preset as desired, for example by a user selecting a layer on the side of the image data sink. Selecting a layer exemplarily takes places during data transmission or during visualization.

The subordinate transferal of the layers different from the reference layer is coupled to a condition triggering this transferal.

A reload case is defined here which means that the image data source has transferred to the image data sink the image data of the reference layer at a presettable reference resolution.

In this case, the image data source is configured to transfer to the image data sink the image data of a presettable number of layers different from the reference layer in at least one presettable reload resolution.

In other words: for real-time visualization, the image data of a reference layer are transmitted from the image data source to the image data sink in different resolutions (i.e. at least two mutually different resolutions). This is the start step of data transmission. The image data of the other layers will only be transmitted when the image data of the one reference layer have been transmitted at a presettable reference resolution. This is the so-called reload case. Only in this case will reloading the image data of the remaining layers take place. The number, to be preset, of the layers to be loaded in the reload case, in one embodiment, equals the number of other layers present different from the reference layer. The reloaded image data of the layers different from the reference layer here are transmitted at least at a presettable reload resolution. Thus, this reload resolution, as is the reference resolution, is one of the resolutions available for the layers in the image data.

An advantage is an efficient visualization of the image data nearly in real-time without blending or loading artifacts. By means of the reload method realized in the system, the result for the observer is the visual effect of focusing, like in the microscope.

A considerable advantage in the application field of microscopy is that reloading image data is dependent on the zoom depth. Thus, image tiles in lower resolution levels are loaded from only a z plane—i.e. from the reference layer level. Only in the highest resolution—as an example, the reference resolution—will the image data of the other layers of the image stacks be reloaded. Therefore, a considerably smaller image data quantity is transmitted all in all.

For the example of the microscopy application case and the variation of the z 0 level as the reference layer, the invention is based on the finding that zooming out of a layer differing from the z 0 level is usually not required.

In one embodiment, for the reference layer subdivided into several fields of view, the image data of a selected field of view are transmitted by the image data source in the at least two resolutions. When reloading, in an embodiment connected thereto, this field of view is subsequently also transmitted from the other layers. In one embodiment, the image data of only one field of view each are transmitted. In an alternative embodiment, the image data of more than one field of view per layer are transmitted.

The field of view selected in the embodiments mentioned above is, for example, when being applied in microscopy, selected by a user by the user causing a lateral movement between the measuring setting and the objective.

The following embodiment is, for example, provided for the user-side selection of the layer which is the reference layer.

In this embodiment, the image data sink is configured to allow selecting from which layer the image data are to be visualized. This means that the user may exemplarily set the image data from which layer she/he wishes to see. This entails that the image data sink is configured to set the layer selected for visualization as the reference layer. When, in the case of microscopy, the user changes the distance between the measuring object and the objective as the object width, she/he will thus also set the layer which then is the reference layer. This means that for this reference layer, the image data of the different resolutions are loaded and subsequently the image data of the other layers. In one embodiment, this entails that the image data are present in different resolutions for several layers.

In particular for the embodiment in which advantageously the image data of only a single field of view among the reference layer and the layers present are transmitted, one embodiment is that a user-side change of the relevant field of view triggers the transmission of the image data described above.

In one embodiment, transmission of the image data from the image data source, as defined in the above explanations, will start when the user has selected one layer as the reference layer or the relevant field of view (as a reference field of view).

One embodiment of the system or, in particular, of a component of the system provides for the image data source to be configured to transfer from the image data source to the image data sink the image data of only the presettable reference layer in at least two mutually different resolutions. This refers to the step present in the case of reloading. For transmitting the image data, in this embodiment, the image data of only the reference layer are transmitted in different resolutions.

An alternative or supplementary embodiment includes the image data source to be configured to only transfer from the image data source to the image data sink the image data of the layers different from the reference layer in only the presettable resolution in the reload case. In this embodiment, only in case the image data of the other layers are transmitted as well, will the respective image data be transmitted in only a reload resolution.

In another embodiment, the image data source is configured to transfer to the image data the image data of the layers different from the reference layer at the reference resolution sink in the reload case.

In one embodiment, it is provided for the reference resolution to be the respective maximum resolution present for the layers in the image data. In this embodiment, at first the image data of the reference layer are transmitted until reaching the highest resolution. Then, the image data of the respective highest resolution will be loaded also for the other layers.

Alternatively, the threshold resolution may be preset specifically on the side of the image data sink, for example by a user intervention, for the individual case.

In accordance with an embodiment, the image data source is connected to at least one picture taking unit—for example in the form of a camera or microscope—and the image data source receives the image data from the picture taking unit.

In accordance with an embodiment, the image data sink is configured to request image data from the image data source, and the image data source is configured to transfer image data to the image data sink, after requested by the image data sink. Alternatively, the image data source transmits the image data to the image data sink without any request.

In one embodiment, the type of transmitting is effected by the image data source being configured to transmit to the image data sink the respective scene of the layers as tiles—which in one embodiment belong to individual fields of view.

In addition, the invention achieves the object by a device for transmitting digitalized image data comprising at least one image data source configured to output image data associated to at least two different layers such that, for at least one of the at least two different layers as the reference layer, the image data are present in at least two different resolutions. Thus, the at least two different layers show a common scene at different conditions of taking a picture. The image data source is configured to transmit the image data of the reference layer in the at least two different resolutions in a prioritized manner relative to image data of layers different from the reference layer. Additionally, the image data source is configured to output, in case the image data source has output the image data of the reference layer at a presettable reference resolution, the image data of a presettable number of layers different from the reference layer.

The above explanations and discussions of the image data source as being part of the system apply correspondingly for the device for transmitting the image data as well.

Thus, in one embodiment, it is provided for the conditions of taking a picture to define a depth of focus setting, object width or spectral sensitivity. The conditions of taking a picture thus are determined also by the method of taking a picture used.

In one embodiment, the image data for the at least two layers are present in at least two different resolutions each. The image data source here is configured to output the image data of one of the at least two layers as the reference layer in the at least two different resolutions. Thus, one layer is labelled as the reference layer compared to the others, at least two and advantageously several layers and is dealt with in a prioritized manner.

The subordinate treatment of the other layers is realized as follows. The image data source is configured to output, in case (referred to as reload case) the image data source has output the image data of the reference layer at a presettable reference resolution, the image data of a presettable number of layers different from the reference layer.

Since the image data source outputs the image data, it also knows when the reference resolution has been output. Alternatively, the image data source is controlled by the receiver-side by emitting a signal signalizing that the image data of a desired resolution, which thus becomes the reference resolution has been output, and that the image data of the other layers may be started to be output in a subordinate manner.

Additionally, the invention achieves the object by the method for visualizing digitalized image data, wherein the image data are associated to several layers, wherein the layers show a common scene at different conditions of taking a picture, and wherein the image data for a reference layer are present in different resolutions. The image data of the reference layer in the different resolutions are transferred and processed as regards visualization in a prioritized manner relative to the image data of layers different from the reference layer. In one embodiment, the image data of the reference layer are transferred in the at least two different resolutions. Additionally, in case the image data of the reference layer have been output at a presettable reference resolution, the image data of a presettable number of layers different from the reference layer are output.

The image data relate to several layers, wherein one layer is preset as a reference layer. The image data of the reference layer are present in several resolutions.

In one embodiment, the image data of the presettable reference layer are transferred from an image data source to an image data sink and processed by the image data sink as regards visualization in at least two of the resolutions present.

In one embodiment, in case (the so-called reload case) the image data of the reference layer have been transferred to the image data sink at a presettable reference resolution, image data of a presettable number of layers different from the reference layer are transferred from the image data source to the image data sink in at least one presettable reload resolution. In one embodiment, the different layers are reloaded only in the presettable reload resolution.

In the embodiments of the method, at first only the image data of a reference layer are transferred from the image data source to the image data sink in different resolutions. If a presettable reference resolution has been transferred, only in this case of reloading the data, will the image data of the other layers be transferred in a presettable number of resolutions or at least a reload resolution preset for reloading. The layers each show a common scene differing among one another in a condition of taking a picture. This may be the object distance, or, alternatively or additionally, the setting of the depth of focus or, still alternatively or additionally, the spectral range used for taking a picture.

In one embodiment, in the reload case, the image data of the other layer are transferred in only a single reload resolution. In one embodiment, this is the reference resolution and, in an additional embodiment, the highest resolution present.

An inventive advantage is data reduction by transferring only the image data of one layer at different resolutions.

In one embodiment of the method, the resolution of the reference layer present in the image data maximally is preset as the reference resolution.

In one embodiment the layer to be visualized is, for example, selected by a user. This layer will then be set as the reference layer and the image data of the different resolutions of the reference layer transmitted in a suitable manner and, advantageously, visualized. When the image data of the reference resolution have been transmitted, the image data of the other layers different from the reference layer are transmitted as well. For example, when the observer changes the layer to be displayed, this also changes the reference layer which is set to be the layer to be displayed.

In another embodiment, among the layers, only a field of view will be transmitted which correspondingly is a reference field of view and which may, for example, be selected as desired by the user. When, in one embodiment, the user changes between the fields of view to be visualized (i.e. when performing a lateral movement in microscopy), this defines the reference layer (or the reference field of view relevant for the reference layer) and data transmission is started.

In one embodiment, the layers differ from one another as regards their position in an image plane. In the example of microscopy, an image plane—for example at an object width—is subdivided into different fields of view which each comprise a different position in this image plane. In this embodiment, the layers thus do not differ, as has exemplarily been discussed above, in their height along the z axis but their x-y position. Thus, in this embodiment, the image data of an image area are transmitted in accordance with the invention.

The implementations and embodiments of the above devices correspondingly also apply to the method, in case the features described are realized by the method. Conversely, the method steps may also be realized by correspondingly configured embodiments of the system or the components thereof so that the implementations and embodiments for the method apply to the system as well.

Furthermore, the invention relates to a computer program comprising program code for performing the method in accordance with any of the above claims or embodiments, when starting from the implementations as regards the system.

Additionally, the invention also refers to a system for data transmission, in particular in the field of visualizing image data, and to a corresponding method for data transmission. Thus, the above implementations and embodiments apply here as well.

BRIEF DESCRIPTION OF THE DRAWINGS

Embodiments of the present invention will be detailed subsequently referring to the appended drawings, in which.

DETAILED DESCRIPTION OF THE INVENTION

Figure 1:
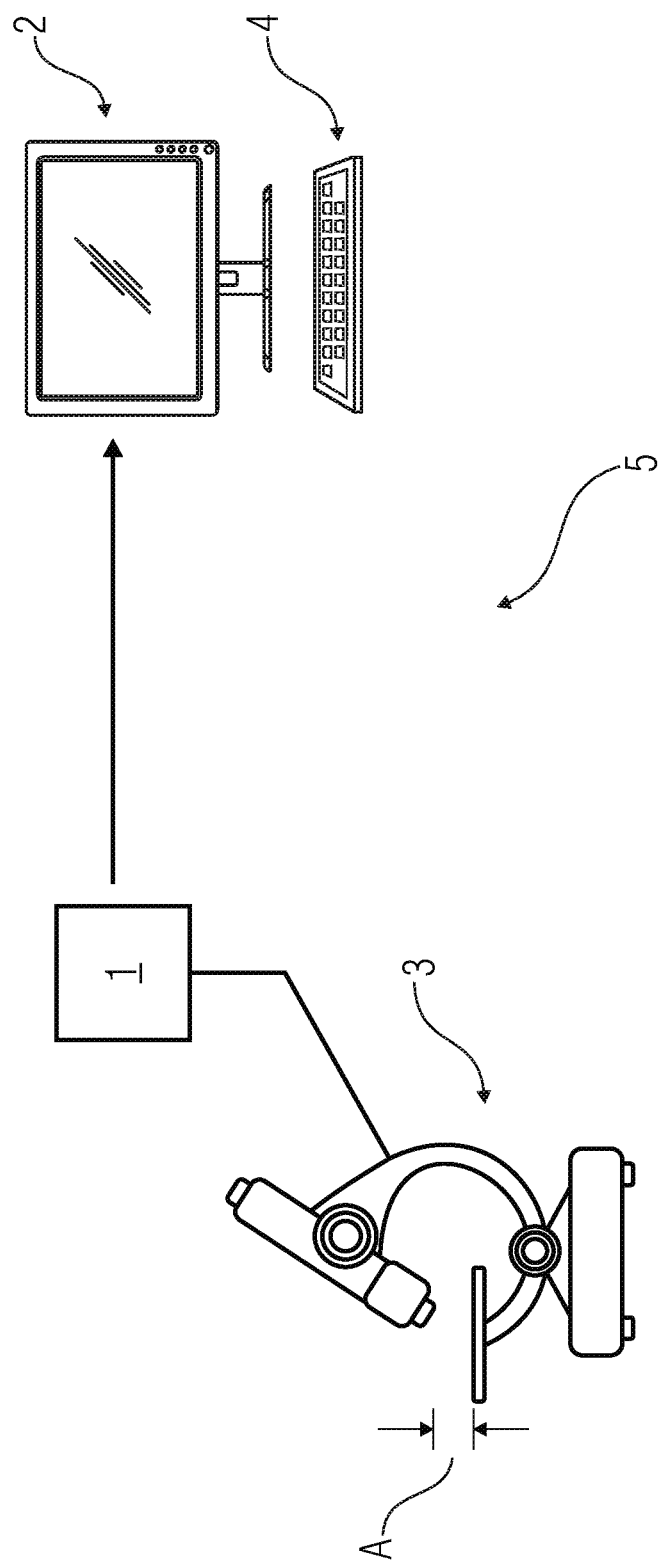
FIG. 1 shows a schematic embodiment of an inventive system.

FIG. 1 schematically shows a realization of the connection between a data source 1 and a data sink 2, wherein the connection here is to be web-based via the Internet.

The data source 1 receives image data from a picture-taking unit 3 which is schematically indicated to be a microscope. Also indicated by A is the object distance or object width between the measuring object and the objective of the microscope 3. The digitalized image data are transferred from the data source 1 to the data sink 2 to be illustrated or displayed visually—indicated by a monitor. For an optional control of the display of the image data, a keyboard is exemplarily shown as a user interface 4. These elements together form a system 5 which allows transmitting image data and, above all, visualization of the image data.

When classical "focusing" is to be visualized using the digitalized image data, the image data are transmitted from the image data source 1 to the image data sink 2 in an order of increasing resolution and displayed there. The inventive system 5 comprising correspondingly implemented components provides for a continuous real-time visualization.

Figure 2:
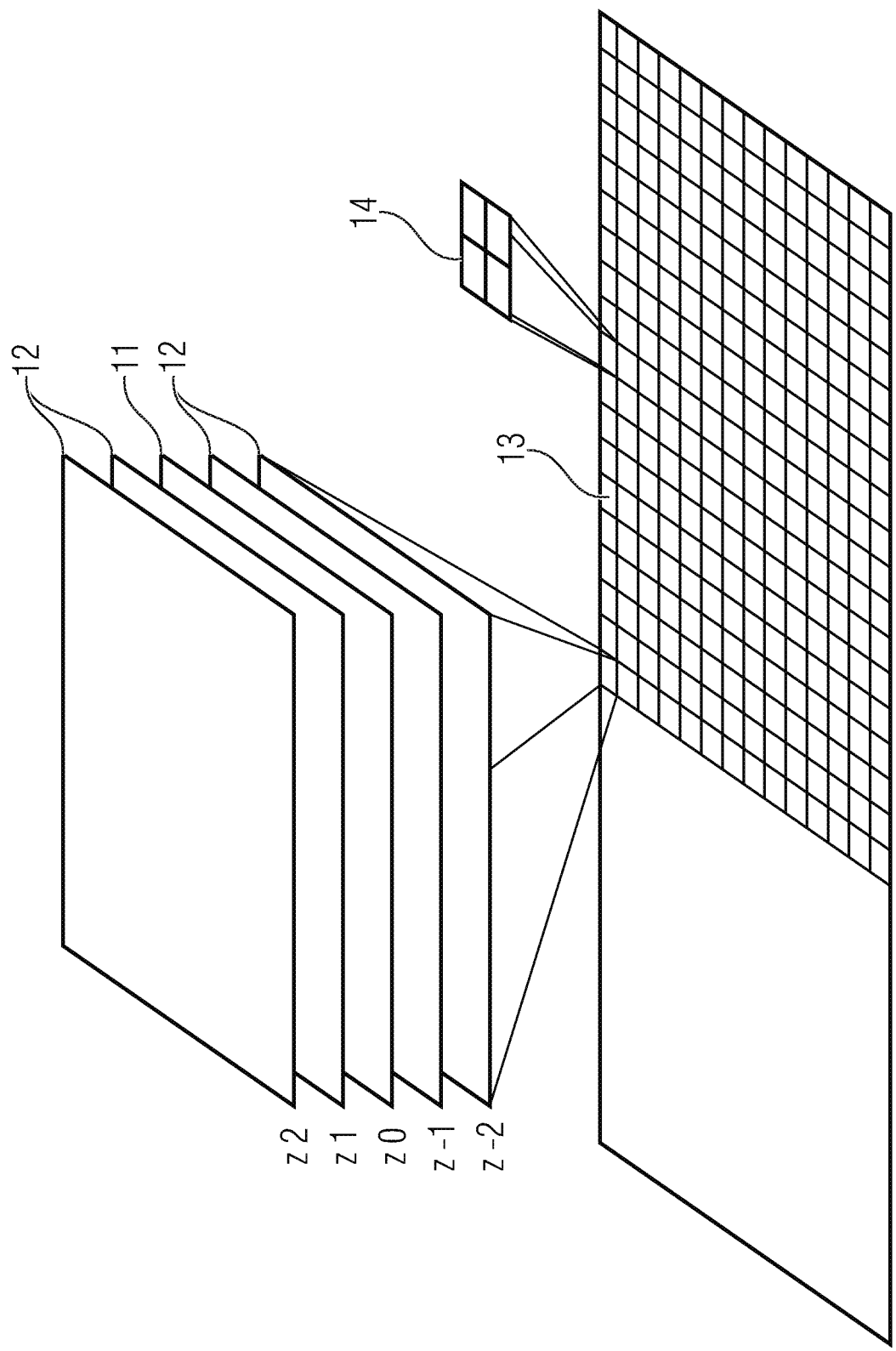
FIG. 2 are schematic illustrations of image data.

Part of the image data available in the image data source is illustrated schematically in FIG. 2. Only a pattern of the scene to be measured, resulting from the individual fields of view arranged next to one another is illustrated here. The actual scene thus results from the measuring object or, generally, the object or region which is measured by the method used or from which the image data are generated using the picture-taking unit used. Depending on the picture-taking unit and, thus, the methods used, the conditions of taking a picture are also defined here as a criterion of differentiation between the individual layers.

What can be seen here are the individual layers 11, 12 of the measuring object indicated having been generated by the microscope 3. The layers are, on one hand, the reference layer 11 which the horizontal position z 0 is associated to and, on the other hand, the layers 12 different from the reference layer 11 which are located above or below the reference layer 11. Correspondingly, the positions z 1 and z 2 and z −1 and z −2 are associated to these layers 12. However, generally any of the layers present may be selected as the reference layer 11. Thus, the positions are associated to the respective object distances A (compare FIG. 1).

The layers 11, 12 are subdivided into individual fields of view 13, wherein the fields of view 13 in turn are subdivided into tiles 14 for data transmission. The image data of the layers 11, 12 are all transmitted in the form of tiles.

Figure 3:
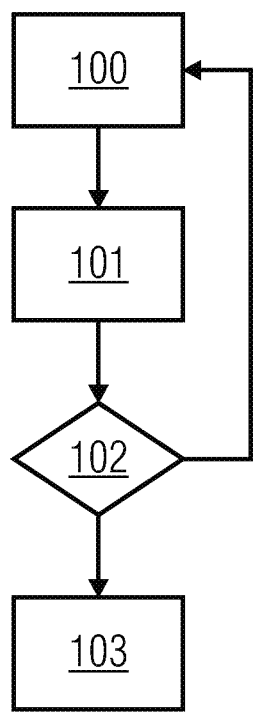
FIG. 3 shows a flow chart of an exemplary flow of the inventive method.

An exemplary flow of the inventive method for visualization is illustrated in FIG. 3.

The starting situation here is that image data from different layers (each showing a common scene at different conditions of taking a picture) is present in different resolutions (which are not among the conditions of taking a picture defining the layers). The image data of the individual layers is present as fields of view or transmitted in the form of tiles.

Exemplarily, the method of focusing is started by the user—not illustrated here. The user in particular has selected one layer and one field of view for visualization and consequently preset for the further procedure. Subsequently, the image data sink exemplarily transmits a data request to the image data source.

In step 100, the data source transfers to the image data sink image data of only the reference layer in a first resolution. In particular, this is the lowest resolution.

In step 101, the image data are received by the image data sink and processed correspondingly for visualization. In the embodiment of FIG. 1 the image data are for example, displayed using the monitor.

In a next step 102, it is decisive whether the resolution of the image data transmitted and received is the preset reference resolution. In the example shown, the reference resolution is the highest resolution present for the image data of the reference layer.

If this is—not yet—the reference resolution, a jump back to step 100 is performed and the next set of image data with the next and, thus, improved resolution is transmitted to the image data sink. Subsequently, in step 102 it is requested again whether this is the reference resolution.

Since the reference resolution here is the highest resolution, the image data of the reference layer will be transmitted and displayed until the best resolution is present, i.e. the image displayed improves continuously for the observer until the maximum has been reached.

In this case—referred to as reload case—the image data of the other layers (i.e. the layers of positions z 1, z 2, z −1 and z −2, compare FIG. 2) are reloaded in step 103.

The image data of the other layers in this example are transmitted only in one resolution and, in particular, only the highest resolution present as the presettable reload resolution.

Finally, the image data for all the layers are present in the data sink in the highest respective resolution. Additionally, for visualizing the process of "focusing", the image data are transmitted from the image data source to the image data sink in several resolutions only for the reference layer. Consequently, the data volume to be transmitted is considerably reduced.

Figure 4:
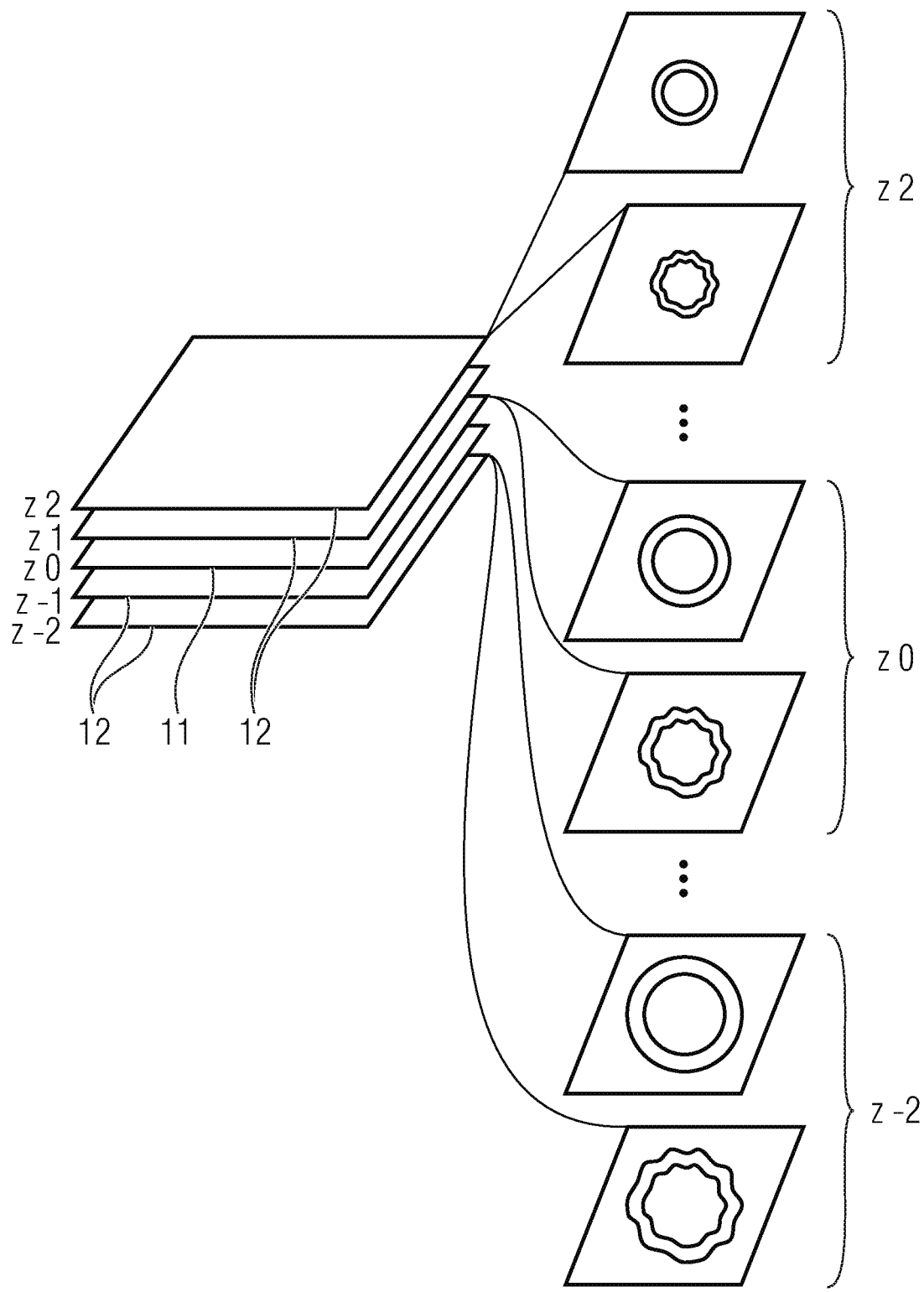
FIG. 4 is an exemplary illustration of the image data transmitted according to the known technology.
Figure 5:
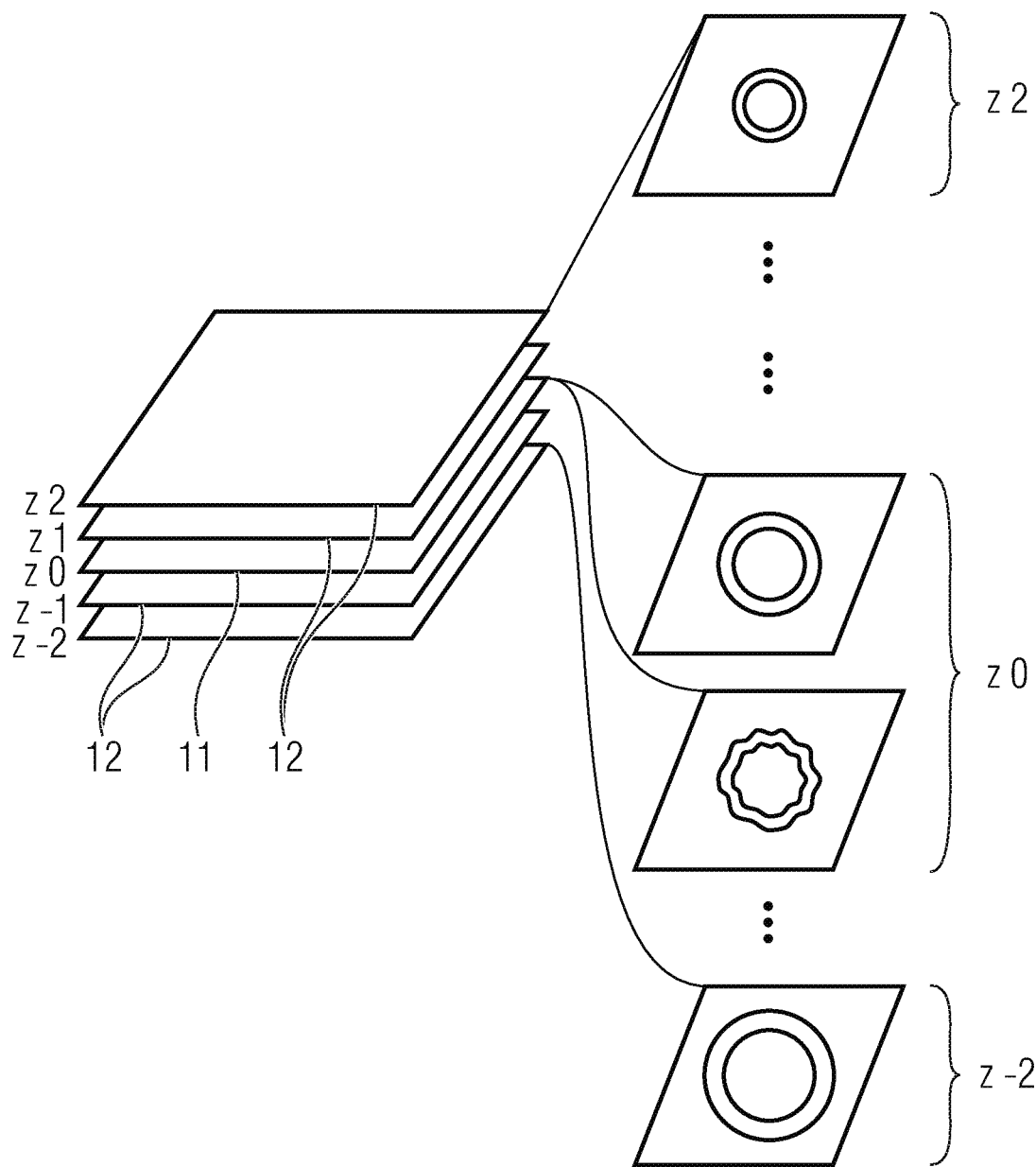
FIG. 5 is an illustration of the corresponding image data transmitted when applying the invention.

The illustrations of FIG. 4 and FIG. 5 serve for illustrating the difference between the invention and the known technology.

FIG. 4 illustrates the stack of layers 11, 12 of FIG. 2. The different conditions of taking a picture here are the different heights or different object distances. The object here, purely exemplarily, is to be a ring-shaped structure which appears to be larger with a decreasing object distance. In addition, every layer is exemplarily present in two resolutions. For clarity reasons, the two resolutions of only three of the five layers (z 2, z 0, z −2) are illustrated. The top illustration is to represent the better resolution, the lower one is to represent the respective lower resolution.

When the image data from all the layers are transmitted at all the resolutions present, as is the case in the known technology, assuming five layers and two resolutions, on the receiver side, there are image data for altogether 10 images at different conditions of taking a picture and different resolutions. This means a correspondingly high data quantity.

However, in the invention, only the image data for the one reference layer 12, which is associated to the position z 0, are transmitted in different resolutions. In the case represented here, image data from the other layers 11 will only be transmitted in the reload case, when the image data of the reference layer at the reference resolution have been transmitted from the image data source—here only in the one reload resolution. Thus, there are image data for only six pictures on the receiver side. The reference resolution here equals the reload resolution and the highest resolution available.

In the known technology, when all the n layers are each present in m resolutions, the image data of n*m tiles are transmitted. In the invention, this is reduced to m+(n−1) tiles, i.e. (n−1)*(m−1) tiles are saved and, consequently, the corresponding data quantity, depending on the embodiment.

Functional features having been described relative to a device also represent—as is obvious to those skilled in the art—respective features of a corresponding method configured so as to provide a corresponding functionality. Conversely, features having been discussed in a method each also represent features of a corresponding device configured to embody corresponding features.

While this invention has been described in terms of several embodiments, there are alterations, permutations, and equivalents which will be apparent to others skilled in the art and which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. A system for visualizing digitalized image data comprising at least one image data source and one image data sink,
wherein the image data are associated to at least two different layers, wherein, for at least one of the at least two different layers as the reference layer, image data are present in at least two different resolutions, wherein the at least two different layers show a common scene at different conditions of taking a picture,
wherein the image data source is configured to transfer image data to the image data sink,
wherein the image data sink is configured to receive image data from the image data source and process same relative to visualization, wherein the image data source is configured to transfer to the image data sink image data of the reference layer in the at least two different resolutions in a prioritized manner relative to image data from layers different from the reference layer, and
wherein the image data source is configured to transfer to the image data sink, in a reload case where the image data source has transferred the image data of the reference layer to the image data sink at a presettable reference resolution, the image data of a presettable number of layers different from the reference layer in at least one presettable reload resolution.

2. The system in accordance with claim 1, wherein
the image data sink is configured to allow selecting from which layer image data are to be visualized, and
the image data sink is configured to set the layer selected for visualization as the reference layer.

3. The system in accordance with claim 1, wherein
the conditions of taking a picture define a depth of focus setting, object width or spectral sensitivity.

4. The system in accordance with claim 1, wherein
the image data for the at least two different layers are present each in at least two different resolutions.

5. The system in accordance with claim 4, wherein
the image data source is configured to transfer from the image data source to the image data sink the image data of only the presettable reference layer in the at least two mutually different resolutions.

6. The system in accordance with claim 5, wherein
the image data source is configured to transfer from the image data source to the image data sink, in the reload case, the image data of the layers different from the reference layer only in the presettable reload resolution.

7. The system in accordance with claim 1, wherein
the image data source is configured to transfer to the image data sink, in the reload case, the image data of the layers different from the reference layer at the reference resolution.

8. The system in accordance with claim 1, wherein
the reference resolution is the respective maximum resolution present for the layers in the image data.

9. The system in accordance with claim 1, wherein
the image data source is connected to at least one picture-taking unit—in particular in the form of a microscope—and the image data source receives the image data from the picture-taking unit.

10. The system in accordance with claim 1, wherein
the image data source is configured to transmit to the image data sink the respective scene of the layers in the form of tiles.

11. A device for transmitting digitalized image data, comprising
at least one image data source configured to output image data associated to at least two different layers so that, for at least one of the at least two different layers as the reference layer, the image data are present in at least two different resolutions,
wherein the at least two different layers show a common scene at different conditions of taking a picture,
wherein the image data source is configured to transmit the image data of the reference layer in the at least two different resolutions in a prioritized manner relative to the image data of layers different from the reference layer, and
wherein the image data source is configured to output, in case the image data source has output the image data of the reference layer at a presettable reference resolution, the image data of a presettable number of layers different from the reference layer.

12. The device in accordance with claim 11, wherein
the image data for the at least two layers are present in at least two different resolutions each.

13. A method for visualizing digitalized image data,
wherein the image data are associated to several layers,
wherein the layers show a common scene at different conditions of taking a picture,
wherein the image data for a reference layer are present in different resolutions,
wherein the image data of the reference layer in the different resolutions are transferred and processed relative to visualization in a prioritized manner relative to the image data of layers different from the reference layer, and
wherein, in case the image data of the reference layer have been output at a presettable reference resolution, the image data of a presettable number of layers different from the reference layer are output.

* * * * *